(12) United States Patent
Zou et al.

(10) Patent No.: US 9,107,029 B2
(45) Date of Patent: Aug. 11, 2015

(54) ONE-TO-MANY 2.4G WIRELESS COMPUTER PERIPHERAL COMMUNICATION DEVICE AND TRANSMISSION METHOD THEREOF

(75) Inventors: Chao Zou, Guangdong (CN); Wenshuai Lin, Guangdong (CN)

(73) Assignee: SHENZHEN RAPOO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/127,496

(22) PCT Filed: Jul. 12, 2011

(86) PCT No.: PCT/CN2011/077073
§ 371 (c)(1),
(2), (4) Date: Dec. 19, 2013

(87) PCT Pub. No.: WO2012/174758
PCT Pub. Date: Dec. 27, 2012

(65) Prior Publication Data
US 2014/0181337 A1    Jun. 26, 2014

(30) Foreign Application Priority Data
Jun. 23, 2011    (CN) .......................... 2011 1 0171380

(51) Int. Cl.
G06F 13/38    (2006.01)
G06F 11/00    (2006.01)
H04W 4/00    (2009.01)
G06F 13/10    (2006.01)
H04B 5/00    (2006.01)

(52) U.S. Cl.
CPC ............... *H04W 4/008* (2013.01); *G06F 13/10* (2013.01); *G06F 13/382* (2013.01); *H04B 5/00* (2013.01)

(58) Field of Classification Search
CPC ............... G06F 1/1632; A61B 5/7475; H04M 2250/04; H04M 1/72527
See application file for complete search history.

(56) References Cited

U.S. PATENT DOCUMENTS

| | | | |
|---|---|---|---|
| 2002/0098870 A1* | 7/2002 | Kashiwagi et al. | 455/561 |
| 2006/0020723 A1* | 1/2006 | Chia-Chun | 710/62 |
| 2008/0162741 A1* | 7/2008 | Christison et al. | 710/18 |
| 2010/0131687 A1* | 5/2010 | Li et al. | 710/106 |
| 2012/0297217 A1* | 11/2012 | Lee et al. | 713/320 |

FOREIGN PATENT DOCUMENTS

| | | |
|---|---|---|
| CN | 2549655 Y | 5/2003 |
| CN | 1862457 A | 11/2006 |

OTHER PUBLICATIONS

International Search Report of PCT Application No. PCT/CN2011/077073.

* cited by examiner

*Primary Examiner* — Hyun Nam

(57) ABSTRACT

The present invention relates to the wireless transmission technology. Disclosed is a one-to-many 2.4G wireless computer peripheral communication device, which includes a 2.4G wireless USB transmit-receive adapter connected with a USB interface of an intelligent appliance and more than one 2.4G wireless computer peripheral cooperated with the USB transmit-receive adapter. Also disclosed is a transmission method of one-to-many 2.4G wireless computer peripheral communication device, which includes the following steps: (1) presetting an occupied time period of each 2.4G wireless computer peripheral; (2) selecting a channel; (3) establishing a channel; and (4) transmitting data. The present invention enables a USB transmit-receive adapter to communicate with more than one peripheral, and has the advantages that the wireless signal is steady, all the peripherals work at the same time without interfering with each other and it is convenient to add computer peripherals.

12 Claims, 2 Drawing Sheets

ONE-TO-MANY 2.4G WIRELESS COMPUTER PERIPHERAL COMMUNICATION DEVICE AND TRANSMISSION METHOD THEREOF

FIELD OF THE INVENTION

The present invention relates to wireless transmission technology, and more particularly relates to a one-to-many 2.4G wireless computer peripheral communication device and transmission method thereof.

BACKGROUND OF THE INVENTION

In the year of 2010, there was a very arresting phenomenon that the wireless keyboards and mouses began to challenge the market position of the wired keyboards and mouses. With the price of wireless keyboards and mouses being revised lower by the manufacturers one after another and the performance of wireless keyboards and mouses being improved continually, more and more consumers began to focus on and buy the products of wireless keyboards and mouses. Compared with the wired keyboards and mouses, the wireless keyboards and mouses occupy smaller space and they are easy to be moved, and there is no doubting of development tendency of expanding market thereof. In two years, the wireless keyboards and mouses took up 40% of public attention, and specifically, it had get 38.8% of attention, thus, its development cannot be ignored.

In earlier wireless audio market, infrared ray and Bluetooth technology were introduced to the wireless headsets, but it did not work well. Due to strong anti-interference ability, transmission distance of 10 m and data transmission rate of 2M in theory, the 2.4G technology made the wireless headsets be highly popular in the year of 2010, thus, it has unlimited market potential.

Mostly, one device is corresponding to one USB wireless transceiver, the increasing household 2.4G wireless products will bring a challenge to the USB interface, and the interference between each USB wireless transceiver also will affect the stability of data transmission.

Additionally, the traditional 2.4G wireless device has the following defects:

1. Incompatible with each other: due to the different technical solutions of various kinds of 2.4G wireless devices, which have different frequency hopping modes, different coding-decoding modes of data packets and different data transmission mechanisms, when using more than one wireless device, it will bring interferences between the devices and even being unable to be used.

2. Limitation of expansion: because the traditional technology mostly only focuses on a certain kind of devices, even if this technology has been becoming a mature technology, it is limited to certain kind of special products and it cannot be expanded to other kind of wireless products by technical innovation, thereby blocking the continuous development of the 2.4G wireless technology.

3. Too many transmitting terminals: when using more than one wireless device, it means that more than one transmitting terminal needs to be inserted thereinto. However, the devices such as laptops cannot supply so many USB interfaces, thereby narrowing the scope of application of the wireless devices.

4. Power consumption issue: the traditional main wireless technology mostly focuses on wireless performance and product function and loses sight of the basic factor of wireless devices, which is power consumption. Due to no consideration for this issue when designing, its power consumption is always hard to be controlled. Due to its short battery life, the wireless products will lose its portability.

5. Weak anti-interference capability: the data transmission mechanism thereof is provided without effective error-correcting capability, which will bring instability of transmission performance after losing the data packets.

6. High cost: due to the lower aggregation degree of the traditional technology, it generally needs five integrated circuits or six integrated circuits to achieve the whole hardware design, which will bring high instability of performance and high cost, thereby reducing the feasibility and the speed of popularization of this technology.

SUMMARY OF THE INVENTION

To overcome the disadvantages of the existing technology, an object of the present invention is to provide a one-to-many 2.4G wireless computer peripheral communication device, which has the advantages that the wireless signal is steady, all the peripherals work at the same time without interfering with each other, THE wireless transmission has strong anti-interference ability and it is convenient to add computer peripherals.

The present invention is achieved by adopting the following technical solutions: a one-to-many 2.4G wireless computer peripheral communication device, includes a 2.4G wireless USB transmit-receive adapter connected with a USB interface of an intelligent appliance, and more than one 2.4G wireless computer peripheral cooperated with the USB transmit-receive adapter.

Specifically, said intelligent appliance is computer or smart TV.

Specifically, said wireless computer peripheral is a combination of any two or more than two of wireless mouse, wireless keyboard, wireless headset, wireless camera, wireless sound box and wireless gamepad, except the combination of wireless mouse and wireless keyboard.

Further disclosed is a transmission method of the one-to-many 2.4G wireless computer peripheral communication device, which includes the following steps:

(1) Presetting an occupied time period of each 2.4G wireless computer peripheral: pre-sort the 2.4G wireless computer peripherals and allocate an occupied time period for each of the 2.4G wireless computer peripherals according to the types thereof, take the sum of all the occupied time periods allocated to each peripheral as a preset cycle time, and then store corresponding information into the 2.4G wireless USB transmit-receive adapter and each 2.4G wireless computer peripheral;

(2) Selecting a channel: after the 2.4G wireless USB transmit-receive adapter starting up, the 2.4G wireless USB transmit-receive adapter will send out testing packets of different channels circularly, pick out a channel with better communication quality according to the success rate of receiving testing packets thereof, and then carry out a calculation so as to determine a frequency hopping sequence;

(3) Establishing a channel: based on the selected channel and pre-sorting of each peripheral, the 2.4G wireless USB transmit-receive adapter will send out different corresponding paging instructions at a periodic interval of preset cycle time; when the 2.4G wireless computer peripherals starting up, the 2.4G wireless computer peripherals will return a reply instruction after receiving a paging instruction; after receiving the reply instruction from a certain 2.4G wireless computer peripheral, the 2.4G wireless USB transmit-receive adapter will send a corresponding data information instruction to this 2.4G wireless computer peripheral during next cycle time, otherwise will continue to send out this paging instruction until build a communication channel with this 2.4G wireless computer peripheral; and (4) Transmitting data: after a certain 2.4G wireless computer peripheral receiving a data information instruction transmitted thereto, this 2.4G wireless computer peripheral will return a reply instruction or a reply instruction with data information during the occupied time period pre-allocated thereto, and then will be in standby mode before next cycle coming; after receiving the reply instruction from a certain 2.4G wireless computer peripheral, the 2.4G wireless USB transmit-receive adapter will send a next section of data information instructions to this 2.4G wireless computer peripheral during next cycle time, otherwise will continue to send out original data information instructions.

As a preferred embodiment, implemented after step (4) is the following step: (5) peripherals exit: when a certain 2.4G wireless computer peripheral does not receive a data information instruction transmitted thereto within a long time, this 2.4G wireless computer peripheral will shut down automatically.

As a preferred embodiment, the step (3) is a step of establishing communication as follows: the 2.4G wireless USB transmit-receive adapter will send out a paging instruction at intervals; after a certain 2.4G wireless computer peripheral starting up and receiving the paging instruction, this 2.4G wireless computer peripheral will return a reply instruction; after receiving this reply instruction, the 2.4G wireless USB transmit-receive adapter will consider this peripheral as first peripheral and take the sum of the preset occupied time period of this peripheral and the time of sending paging instruction as a next cycle time, send a data information instruction containing next cycle time to this peripheral during the occupied time period of this peripheral and send out paging instruction during the time of sending paging instruction; other peripherals will return a reply instruction after receiving a paging instruction; after receiving this reply instruction, the 2.4G wireless USB transmit-receive adapter will consider this peripheral as second peripheral and the working time of this peripheral will be arranged after the first peripheral, take the sum of the occupied time period of the first peripheral, the occupied time period of the second peripheral and the time of sending paging instruction as a next cycle time, and then send different data information instructions containing next cycle time during the occupied time period of the first peripheral and the occupied time period of the second peripheral, respectively, and send the paging instruction during the time of sending paging instruction; and add other peripherals gradually.

As a preferred embodiment, implemented after step (4) is the following step: (5) peripherals exit: when a certain 2.4G wireless computer peripheral does not receive a data information instruction transmitted thereto within a long time, this 2.4G wireless computer peripheral will shut down automatically; when the 2.4G wireless USB transmit-receive adapter does not receive a reply instruction or a reply instruction with data information returned by a certain 2.4G wireless computer peripheral within a long time, the 2.4G wireless USB transmit-receive adapter will consider this peripheral as being exiting, subtract the occupied time period of this peripheral from next cycle time and then move the position of the peripheral which is following this peripheral forward in the sequence and send the changed information contained in the data information instruction to all the working peripherals.

Specifically, said wireless computer peripheral is a combination of any two or more than two of wireless mouse, wireless keyboard, wireless headset, wireless camera, wireless sound box and wireless gamepad, except the combination of wireless mouse and wireless keyboard.

In the present invention, a transmit-receive adapter is provided as main device to connect with more than one terminal peripheral, so as to constitute a one-to-many local wireless network by means of different channel links and data packets of signal coding. Furthermore, the transmit-receive adapter is capable of processing the output signals of audio-visual equipment and controlling the audio-visual equipment by an interface driver, thereby realizing a wireless connection between the audio-visual equipment and all the terminals. The application software is designed with special coding mechanism and data transmission mechanism, thus, no interference will be produced among all the devices. Power saving technology: under standby mode, a breathing mode is provided to control the work status of different devices and under this breathing mode, an automatic shutdown is provided after proper time.

DETAILED DESCRIPTION OF ILLUSTRATED EMBODIMENTS

The present invention will now be further described detailedly as follows with reference to some embodiments and the accompanying drawings.

The First Embodiment

Figure 1:
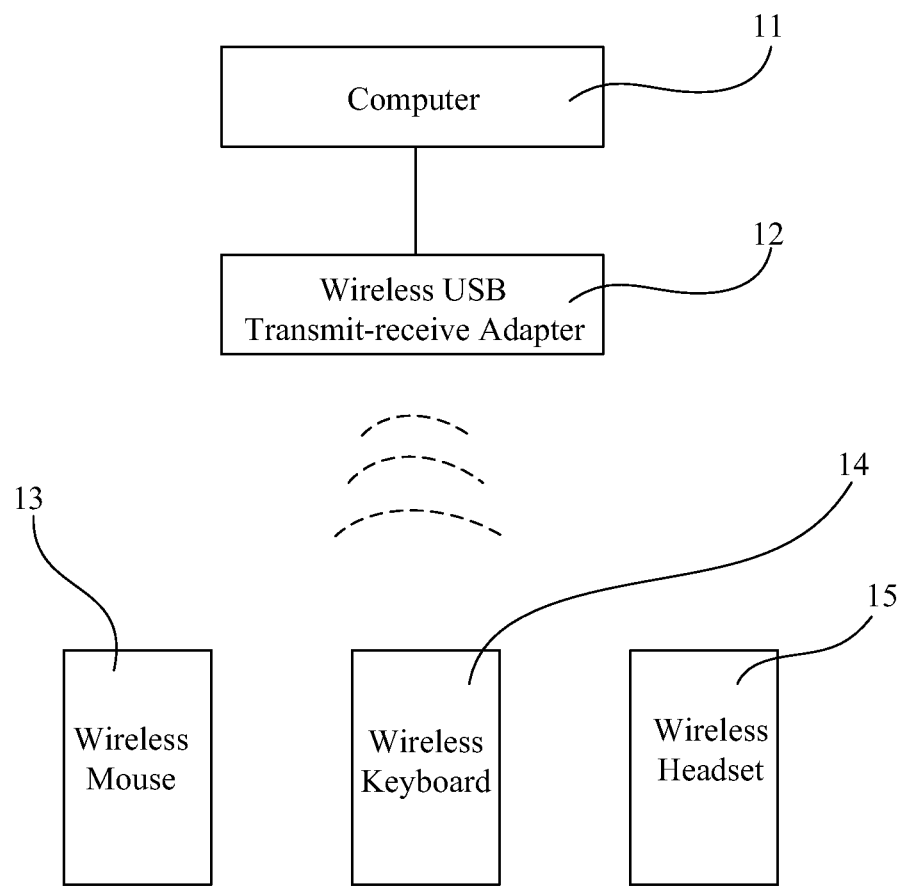
FIG. 1 is a structure diagram of a one-to-many 2.4G wireless computer peripheral communication device according to a first embodiment of the present invention.

As shown in FIG. 1, a one-to-three 2.4G wireless computer peripheral communication device includes a 2.4G wireless USB transmit-receive adapter 12 connected with a USB interface of a computer 11 and includes a wireless mouse 13, a wireless keyboard 14 and a wireless headset 15 all cooperated with the 2.4G wireless USB transmit-receive adapter 12.

A transmission method of the one-to-three 2.4G wireless computer peripheral communication device includes the following steps:

(1) Presetting an occupied time period of each 2.4G wireless computer peripheral. For example, preset the occupied time period of wireless mouse 13 being T1, the occupied time period of wireless keyboard 14 being T2 and the occupied time period of wireless headset 15 being T3, then take T1+T2+T3 as a cycle time T, and then store corresponding information into the 2.4G wireless USB transmit-receive adapter 12, the wireless mouse 13, wireless keyboard 14 and wireless headset 15.

(2) Selecting a channel: after the 2.4G wireless USB transmit-receive adapter 12 starting up, the 2.4G wireless USB transmit-receive adapter 12 will send out testing packets of different channels circularly, pick out a channel with better communication quality according to the success rate of receiving testing packets thereof, and then carry out a calculation so as to determine a frequency hopping sequence.

(3) Establishing a channel: based on the selected channel, the 2.4G wireless USB transmit-receive adapter 12 will send out different paging instructions to the wireless mouse 13, wireless keyboard 14 and wireless headset 15, respectively, during the time of T1, T2, T3, at a periodic interval of the time of T. When the wireless mouse 13, wireless keyboard 14 and wireless headset 15 starting up, each of them will return a reply instruction after receiving a paging instruction. After receiving the reply instruction from the wireless mouse 13, wireless keyboard 14 or wireless headset 15, the 2.4G wireless USB transmit-receive adapter 12 will send a corresponding data information instruction to it during next T1, T2 or T3, otherwise the 2.4G wireless USB transmit-receive adapter 12 will continue to send out paging instructions until establish a communication channel with the wireless mouse 13, wireless keyboard 14 or wireless headset 15.

(4) Transmitting data: after receiving the data information instructions, the wireless mouse 13 and wireless keyboard 14 will return a reply instruction with data information during the time of T1 and T2 of the time of T, and the wireless headset 15 will return a reply instruction during the time of T3 of the time of T, and then they will be in standby mode during other times before next cycle coming. After receiving the reply instruction from a certain 2.4G wireless computer peripheral, the 2.4G wireless USB transmit-receive adapter 12 will send a next section of data information instructions to this 2.4G wireless computer peripheral during next cycle time or else will continue to send out original data information instructions.

(5) Peripherals exit: when the wireless mouse 13, wireless keyboard 14 or wireless headset 15 does not receive a data information instruction transmitted thereto within a long time, it will shut down automatically.

The Second Embodiment

Figure 2:
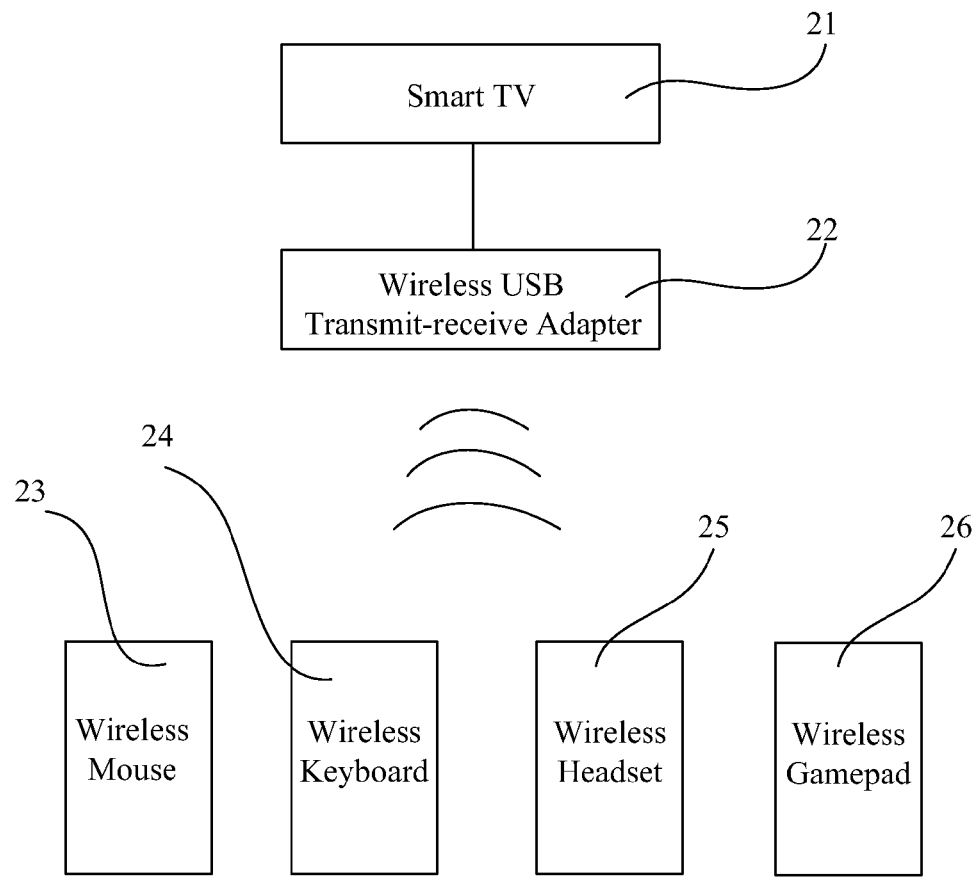
FIG. 2 is a structure diagram of a one-to-many 2.4G wireless computer peripheral communication device according to a second embodiment of the present invention.

As shown in FIG. 2, a one-to-four 2.4G wireless computer peripheral communication device includes a 2.4G wireless USB transmit-receive adapter 22 connected with a USB interface of a smart TV (television) 21 and includes a wireless mouse 23, a wireless keyboard 24, a wireless headset 25 and a wireless gamepad 26 all cooperated with the 2.4G wireless USB transmit-receive adapter 22.

A transmission method of the one-to-four 2.4G wireless computer peripheral communication device includes the following steps:

(1) Presetting an occupied time period of each 2.4G wireless computer peripheral. For example, preset the occupied time period of wireless mouse 23 being T1, the occupied time period of wireless keyboard 24 being T2, the occupied time period of wireless headset 25 being T3 and the occupied time period of wireless gamepad 26 being T4, then determine the length of the occupied time periods according to their data traffics, and then store the corresponding information into the 2.4G wireless USB transmit-receive adapter 22, the wireless mouse 23, wireless keyboard 24, wireless headset 25 and wireless gamepad 26.

(2) Selecting a channel: after the 2.4G wireless USB transmit-receive adapter 22 starting up, the 2.4G wireless USB transmit-receive adapter 22 will send out testing packets of different channels circularly, pick out a channel with better communication quality according to the success rate of receiving testing packets thereof, and then carry out a calculation so as to determine a frequency hopping sequence.

(3) Establishing a channel: the 2.4G wireless USB transmit-receive adapter 22 will send out a paging instruction at intervals. When a certain peripheral such as the wireless mouse 23 starting up, it will return a reply instruction after receiving the paging instruction. After receiving this reply instruction, the 2.4G wireless USB transmit-receive adapter 22 will consider the wireless mouse 23 as first peripheral and take the sum of the preset occupied time period T1 of the wireless mouse 23 and the time T5 of sending paging instruction as a next cycle time; send a data information instruction containing the next cycle time (T1+T5) to wireless mouse 23 during its occupied time period and send out paging instruction during the time T5 of sending paging instruction. Other peripheral such as the wireless gamepad 26 will return a reply instruction after receiving a paging instruction. After receiving this reply instruction, the 2.4G wireless USB transmit-receive adapter 22 will consider the wireless gamepad 26 as second peripheral and the working time of this peripheral will be arranged after the wireless mouse 23, will take the sum of the occupied time period T1 of the wireless mouse 23, the occupied time period T4 of the wireless gamepad 26 and the time T5 of sending paging instruction as a next cycle time, and then send different data information instructions containing the next cycle time (T1+T4+T5) during the occupied time period T1 of the first peripheral and the occupied time period T4 of the second peripheral, respectively, and send paging instruction during the time T5 of sending paging instruction; and add other peripherals gradually by this.

(4) Transmitting data: after the wireless mouse 23, wireless keyboard 24, wireless headset 25 or wireless gamepad 26 receiving a data information instruction transmitted thereto, it will return a reply instruction or return a reply instruction with data information during its pre-allocated occupied time period, and then it will be in standby mode within other times before next cycle coming. After receiving the reply instruction from the wireless mouse 23, wireless keyboard 24, wireless headset 25 or wireless gamepad 26, the 2.4G wireless USB transmit-receive adapter 22 will send a next section of data information instructions to this 2.4G wireless computer peripheral within next cycle time or else will continue to send out original data information instruction.

(5) Peripherals exit: when a certain peripheral does not receive a data information instruction transmitted thereto within a long time, this 2.4G wireless computer peripheral will shut down automatically. When the 2.4G wireless USB transmit-receive adapter 22 does not receive a reply instruction or a reply instruction with data information returned by a certain 2.4G wireless computer peripheral within a long time, the 2.4G wireless USB transmit-receive adapter will consider this peripheral as being exiting, subtract the occupied time period of this peripheral from next cycle time and then move the position of the peripheral which is following this peripheral forward in the sequence and send the changed information contained in the data information instruction to all the working peripherals.

Above descriptions of embodiments are provided for further illustrating the one-to-many 2.4G wireless computer peripheral communication device and transmission method of the present invention, so as to facilitate understanding and it is to be understood that the invention is not to be limited to the disclosed embodiments. Any change, modification, replacement, combination or simplification according to the present invention should be included within the scope of protection of the invention.

What is claimed is:

1. A transmission method of the one-to-many 2.4G wireless computer peripheral communication device comprising a 2.4G wireless USB transmit-receive adapter connected with a USB interface of an intelligent appliance, and more than one 2.4G wireless computer peripheral cooperated with the USB transmit-receive adapter, comprising the following steps:

(1) Presetting an occupied time period of each 2.4G wireless computer peripheral: pre-sort the 2.4G wireless computer peripherals and allocate an occupied time period for each of the 2.4G wireless computer peripherals according to the types thereof, take the sum of all the periods of occupied time period allocated to each peripheral as a preset cycle time, and then store corresponding information into the 2.4G wireless USB transmit-receive adapter and each 2.4G wireless computer peripheral;

(2) Selecting a channel: after the 2.4G wireless USB transmit-receive adapter starting up, the 2.4G wireless USB transmit-receive adapter will send out testing packets of different channels circularly, pick out a channel with better communication quality according to the success rate of receiving testing packets thereof, and then carry out a calculation so as to determine a frequency hopping sequence;

(3) Establishing a channel: based on the selected channel and pre-sorting of each peripheral, the 2.4G wireless USB transmit-receive adapter will send out different corresponding paging instructions at a periodic interval of preset cycle time; when the 2.4G wireless computer peripherals starting up, the 2.4G wireless computer peripherals will return a reply instruction after receiving a paging instruction; after receiving the reply instruction from a certain 2.4G wireless computer peripheral, the 2.4G wireless USB transmit-receive adapter will send a corresponding data information instruction to this 2.4G wireless computer peripheral during next cycle time, otherwise will continue to send out this paging instruction until build a communication channel with this 2.4G wireless computer peripheral; and (4) Transmitting data: after a certain 2.4G wireless computer peripheral receiving a data information instruction transmitted thereto, this 2.4G wireless computer peripheral will return a reply instruction or a reply instruction with data information during the occupied time period pre-allocated thereto, and then will be in standby mode before next cycle coming; after receiving the reply instruction from a certain 2.4G wireless computer peripheral, the 2.4G wireless USB transmit-receive adapter will send a next section of data information instructions to this 2.4G wireless computer peripheral during next cycle time, otherwise will continue to send out original data information instructions.

2. The transmission method of the one-to-many 2.4G wireless computer peripheral communication device according to claim 1, wherein further comprises a following step which will be implemented after step (4):

(5) Peripherals exit: when a certain 2.4G wireless computer peripheral does not receive a data information instruction transmitted thereto within a long time, this 2.4G wireless computer peripheral will shut down automatically.

3. The transmission method of the one-to-many 2.4G wireless computer peripheral communication device according to claim 1, wherein the step (3) is a step of establishing communication: the 2.4G wireless USB transmit-receive adapter will send out a paging instruction at intervals; after a certain 2.4G wireless computer peripheral starting up and receiving the paging instruction, this 2.4G wireless computer peripheral will return a reply instruction; after receiving this reply instruction, the 2.4G wireless USB transmit-receive adapter will consider this peripheral as first peripheral and take the sum of the preset occupied time period of this peripheral and the time of sending paging instruction as a next cycle time, send a data information instruction containing next cycle time to this peripheral during the occupied time period of this peripheral and send out paging instruction during the time of sending paging instruction; other peripherals will return a reply instruction after receiving a paging instruction; after receiving this reply instruction, the 2.4G wireless USB transmit-receive adapter will consider this peripheral as second peripheral and the working time of this peripheral will be arranged after the first peripheral, take the sum of the occupied time period of the first peripheral, the occupied time period of the second peripheral and the time of sending paging instruction as a next cycle time, and then send different data information instructions containing next cycle time during the occupied time period of the first peripheral and the occupied time period of the second peripheral, respectively, and send the paging instruction during the time of sending paging instruction; and add other peripherals gradually.

4. The transmission method of the one-to-many 2.4G wireless computer peripheral communication device according to claim 2, wherein further comprises a following step which will be implemented after step (4):

(5) Peripherals exit: when a certain 2.4G wireless computer peripheral does not receive a data information instruction transmitted thereto within a long time, this 2.4G wireless computer peripheral will shut down automatically; when the 2.4G wireless USB transmit-receive adapter does not receive a reply instruction or a reply instruction with data information returned by a certain 2.4G wireless computer peripheral within a long time, the 2.4G wireless USB transmit-receive adapter will consider this peripheral as being exiting, subtract the occupied time period of this peripheral from next cycle time and then move the position of the peripheral which is following this peripheral forward in the sequence and send the changed information contained in the data information instruction to all the working peripherals.

5. The transmission method of the one-to-many 2.4G wireless computer peripheral communication device according to claim 1, wherein said wireless computer peripheral is a combination of any two or more than two of wireless mouse, wireless keyboard, wireless headset, wireless camera, wireless sound box and wireless gamepad, except the combination of wireless mouse and wireless keyboard.

6. The transmission method of the one-to-many 2.4G wireless computer peripheral communication device according to claim 2, wherein said wireless computer peripheral is a combination of any two or more than two of wireless mouse, wireless keyboard, wireless headset, wireless camera, wireless sound box and wireless gamepad, except the combination of wireless mouse and wireless keyboard.

7. The transmission method of the one-to-many 2.4G wireless computer peripheral communication device according to claim 3, wherein said wireless computer peripheral is a combination of any two or more than two of wireless mouse, wireless keyboard, wireless headset, wireless camera, wireless sound box and wireless gamepad, except the combination of wireless mouse and wireless keyboard.

8. The transmission method of the one-to-many 2.4G wireless computer peripheral communication device according to claim 4, wherein said wireless computer peripheral is a combination of any two or more than two of wireless mouse, wireless keyboard, wireless headset, wireless camera, wireless sound box and wireless gamepad, except the combination of wireless mouse and wireless keyboard.

9. The transmission method of the one-to-many 2.4G wireless computer peripheral communication device according to claim 1, wherein said intelligent appliance is computer or smart TV.

10. The transmission method of the one-to-many 2.4G wireless computer peripheral communication device according to claim 2, wherein said intelligent appliance is computer or smart TV.

11. The transmission method of the one-to-many 2.4G wireless computer peripheral communication device according to claim 3, wherein said intelligent appliance is computer or smart TV.

12. The transmission method of the one-to-many 2.4G wireless computer peripheral communication device according to claim 4, wherein said intelligent appliance is computer or smart TV.

\* \* \* \* \*